United States Patent
Sturm et al.

(10) Patent No.: US 10,069,382 B2
(45) Date of Patent: Sep. 4, 2018

(54) EARTHING DEVICE

(71) Applicant: ebm-papst Mulfingen GmbH & Co. KG, Mulfingen (DE)

(72) Inventors: Michael Sturm, Bad Mergentheim (DE); Wolfang Ströbel, Blaufelden (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 344 days.

(21) Appl. No.: 14/856,025

(22) Filed: Sep. 16, 2015

(65) Prior Publication Data

US 2016/0111941 A1 Apr. 21, 2016

(30) Foreign Application Priority Data

Oct. 21, 2014 (DE) .................... 10 2014 115 291

(51) Int. Cl.
*H02K 11/40* (2016.01)
*H02K 11/00* (2016.01)

(52) U.S. Cl.
CPC ......... *H02K 11/0089* (2013.01); *H02K 11/40* (2016.01)

(58) Field of Classification Search
CPC ........................ H02K 11/0089; H02K 11/40
USPC ...................... 310/68 R; 361/220; 174/6, 51
See application file for complete search history.

(56) References Cited

U.S. PATENT DOCUMENTS

| 2,821,664 A * | 1/1958 | Dimitroff, Jr. ......... H02K 11/40 |
| | | 174/6 |
| 4,358,699 A | 11/1982 | Wilsdorf |
| 4,443,726 A | 4/1984 | Ikegami et al. |
| 5,069,415 A * | 12/1991 | Mechalas ............... H02K 5/26 |
| | | 248/604 |
| 6,071,125 A | 6/2000 | Shiozawa |
| 6,903,484 B1 | 6/2005 | Kuhlmann-Wilsdorf et al. |
| 7,193,836 B2 | 3/2007 | Oh et al. |
| 7,339,777 B2 * | 3/2008 | Barnard ................ H01R 39/64 |
| | | 361/212 |
| 8,493,707 B2 * | 7/2013 | Cutsforth ............... H01R 39/64 |
| | | 361/220 |

(Continued)

FOREIGN PATENT DOCUMENTS

| DE | 3217217 A1 | 12/1982 |
| DE | 69414687 T2 | 6/1999 |

(Continued)

*Primary Examiner* — Forrest M Phillips
(74) *Attorney, Agent, or Firm* — Brinks Gilson & Lione

(57) ABSTRACT

The invention relates to an earthing device for preventing rotor-induced bearing currents in an electric motor, comprising an electrically conductive annular element having retaining means arranged thereon, to which means fiber bundles are fastened, via which bundles electrical discharge of a static charge to at least one discharge element can be carried out, wherein the fiber bundles are fastened so as to be oriented in an oblique angular position with respect to a radial plane which is perpendicular to an axial center line of the annular element and/or with respect to an axial plane and have a length protruding from the retaining means of the annular element which is greater than that required to bridge a radial spacing between the annular element and the discharge element.

16 Claims, 4 Drawing Sheets

(56) References Cited

U.S. PATENT DOCUMENTS

| | | | | |
|---|---|---|---|---|
| 2006/0157266 A1* | 7/2006 | Mahlandt | | H01R 4/66 |
| | | | | 174/78 |
| 2006/0237210 A1* | 10/2006 | Cheng | | H01R 4/64 |
| | | | | 174/51 |
| 2007/0138748 A1 | 6/2007 | Orlowski et al. | | |
| 2013/0032373 A1* | 2/2013 | Cutsforth | | H01R 39/64 |
| | | | | 174/68.1 |

FOREIGN PATENT DOCUMENTS

| | | |
|---|---|---|
| DE | 602004011867 T2 | 3/2009 |
| EP | 1755207 A2 | 2/2007 |
| EP | 1885034 A1 | 2/2008 |
| EP | 1872463 B1 | 5/2011 |
| EP | 2137805 B1 | 10/2013 |
| JP | 62258105 A | 11/1987 |
| WO | WO 2011/034788 A1 | 3/2011 |

\* cited by examiner

EARTHING DEVICE

RELATED APPLICATIONS

The present patent document claims the benefit of priority to German Patent Application No. 102014115291.3, filed Oct. 21, 2014, the entire contents of which are incorporated herein by reference.

FIELD

The disclosure relates to an earthing device for preventing rotor-induced bearing currents in an electric motor, comprising an electrically conductive annular element having retaining means arranged thereon, to which means fibre bundles are fastened, via which bundles electrical discharge of static charges to a discharge element can be carried out so that said charges do not reach the bearing.

BACKGROUND

It is known from the prior art that currents induced in the rotor and conducted via the rotor shaft have a damaging effect on the shaft bearings in electric motors ("bearing currents"). As soon as the induced currents overcome the resistance of the bearing lubricant, they discharge via the bearing and damage the ball raceway, causing melt craters, corrosion and profile damage. This initially leads to bearing noises and a premature total failure.

In order to overcome this, solutions have already been proposed in the prior art, in which solutions the rotor shaft is completely electrically insulated. In this case, the rotor shaft has shoulders in the bearing regions which are extrusion coated with plastics material. Moreover, distance plates made of electrically insulating resin bonded fabric are used for preventing direct contact (on the rotor side and the stator side) between the press-fitted shaft in the rotor and the bearings.

We have found that a disadvantage of the plastics extrusion coating is that this tends to creep or sink in particular under the effect of heat, and does not constitute a robust system in the long term. The use is also restricted, since it is not suitable for drive motors, for example, which exert a pulsating load on the extrusion coating on account of the increased rotational speeds and the additional radial force. A further disadvantage is that the extrusion coating is not only electrically insulating, but also thermally insulating. This in turn leads to an undesirable increase in the bearing temperature. In this case, it is mainly the rotor-side bearing which is affected, since said bearing experiences the highest load of both bearings and is usually located at the end of the stator bush. In an arrangement of this kind, heat can be conducted away only by the stator bush, which has already been heated by the coil.

A further option for preventing bearing currents is the use of hybrid ball bearings, in which ceramic balls prevent electrical conductance. However, this is very costly.

Further background information and examples of devices for discharging charges are described for example in EP1460885 B1 and EP523086 B1, in which annular elements having bristles engage on a shaft in order to discharge static charges via the shaft.

SUMMARY

In this context, the present disclosure provides a device which is improved in terms of effect and is cheaper than known solutions, by means of which rotor-induced static charges in electric motors can be discharged in such a way that said charges do not flow through or via the bearing(s) of the rotor shaft in the form of bearing currents.

In claim 1, an earthing device is provided, comprising an electrically conductive annular element having retaining means arranged thereon, to which means fibre bundles are fastened, via which bundles electrical discharge of a static charge can be carried out to at least one discharge element, wherein the fibre bundles are fastened so as to be oriented in an oblique angular position with respect to a plane (radial plane) which is perpendicular to an axial centre line of the annular element and/or with respect to an axial plane, and have a length protruding from the retaining means of the annular element which is greater than that required to bridge a radial spacing between the annular element or the retaining means of the annular element and the discharge element.

The earthing device is used in an electric motor, preferably as an annular element between the stator bush and the shaft bearing, so that rotor-induced charges can be conducted away via the stator bush and directly via the rotor shaft without reaching the shaft bearing. The earthing device comprising the annular element is to be configured in such a way that the electrical resistance thereof is lower than that of the shaft bearing. Preferably, the material thickness of the annular element should be selected to be as thin as possible, so that said element can be easily shaped without a great application of force and is also cost-effective on account of the small amount of material used. However, the material thickness must also be sufficiently thick for the annular element to be able to reliably conduct away the bearing currents via the material cross section thereof. Thus, according to the disclosure a thickness of the annular element of from 0.2-5 mm, in particular 0.5-1 mm, is preferred. A brass or bronze punched metal sheet is used as the material for the annular element. The earthing device can therefore be produced in a very cost-effective manner.

The reduction in cost is achieved by the fundamental configuration of the earthing device as an electrically conductive metal annular element, which ensures improved and longer-lasting discharge of the static charges due to the combination of the oblique angular position of the fibre bundles relative to the discharge element and the excess length of the portion of the fibre bundles protruding from the annular element. According to the disclosure, the fibre bundles have an oblique angular position with respect to one or both perpendicular planes to the axial centre line of the annular element, i.e. the fibre bundles are arranged on the annular element so as to have a single or preferably double (in two directions) inclination.

One aspect of the disclosure provides for the earthing device to be characterised in that the fibre bundles are fastened so as to be oriented as a first inclination at an angle α of from 5-45°, in particular 5-30°, more preferably 10-25° with respect to the radial plane of the annular element.

A further aspect of the disclosure provides for the earthing device to be characterised in that the fibre bundles are fastened so as to be oriented as a second inclination at an angle β of from 5-15° with respect to the axial plane of the annular element.

A gastight and fluidtight connection occurs between the fibre bundles and the rotor shaft by means of the very low contact resistance produced by the oblique angular position (s). Extending the fibre bundles beyond the length actually required for making contact with the discharge element also leads to improved contact without increased wear. An embodiment in which the length of the fibre bundles protruding from the annular element is approximately 5-15%, preferably 10%, greater than the radial spacing between the annular element and the discharge element has been found to be particularly favourable.

Furthermore, an embodiment of the disclosure in which webs extend in the radial direction on the annular element, which webs are each formed having tabs and to which the fibre bundles are crimped, is also advantageous. In principle, the disclosure includes embodiments of the annular element having radially inwardly pointing and radially outwardly pointing webs and fibre bundles. In a solution comprising radially inwardly pointing webs and fibre bundles, the rotating rotor shaft acts as a discharge element and contact for the fibre bundles. In a solution comprising radially outwardly pointing webs and fibre bundles, the stator bush acts as a discharge element and contact for the fibre bundles, the annular element being fastened to the rotor shaft and rotating therewith.

A particular aspect of the earthing device provides for a projection to be formed on each of the respective tabs, which projection separates the fibre bundles into a first and second fibre bundle. The separated first and second fibre bundles extend, separately from one another, through said projection and each permit individual electrical discharge of the bearing currents to at least one discharge element, which discharge is independent of the direction of rotation. The separation into two fibre bundles basically permits the top side of the rotor shaft to be "encompassed", and forms a reliable contact irrespective of the direction in which the rotor shaft rotates.

Moreover, embodiments of the fibre bundles in which said bundles are formed of fibres made of different materials and comprise at least carbon fibres and metal or plastics material fibres are advantageous. In order to increase self-lubrication, graphite fibres may in addition be included.

In order to increase the contact surface and thus provide further improved contact, in one variant the fibre bundles are oval in cross section. The fibre bundles are then advantageously oriented in the tabs in such a way that the wider edge portion of the oval shape points in the circumferential direction and therefore comes into contact with the discharge element.

In a further aspect of the disclosure, the earthing device additionally comprises a spring washer which is fastened to the annular element, such that the annular element and the spring washer are formed as one component for the purpose of assembly. The spring washer is fixed by spot welds or by clamps integrated on the annular element. A variant of the spring washer in a wave shape is favourable, said washer advantageously being in contact with the annular element at the recurrent wave troughs and fastened there. It is also advantageous for assembly for the size of the spring washer to substantially correspond to that of the annular element.

For improved ease of assembly, it is further advantageous in some configurations to form the annular element as an open ring having an opening in the circumference thereof. According to the disclosure, it is then provided for it to be possible to close the opening by means of a fastener. A T-slot solution or a dovetail engagement may be provided as a fastener.

Finally, it is favourable for the annular element to comprise impressions recurring in the circumferential direction, which impressions provide a spring function in order to bring about permanent axial bracing in the assembled state, even in the event of temperature changes, between the contact surface of the adjacent component (usually the stator bush) and the contact surface of the bearing.

Other advantageous developments of the disclosure are characterised in the dependent claims and will be explained in further detail in the following, in conjunction with the description serve to explain the principles of the invention, with reference to the drawings. In the drawings:

BRIEF DESCRIPTION OF THE DRAWINGS

The figures are schematic and by way of example. Identical reference signs denote identical parts in all the views.

DETAILED DESCRIPTION

Figure 1:
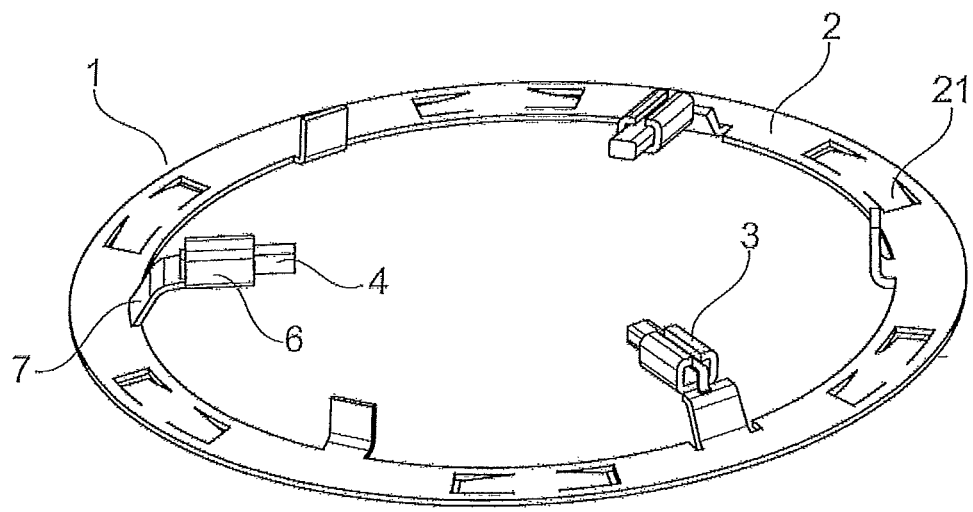
FIG. 1 is a perspective view of an earthing device.

FIG. 1 is a perspective view of the earthing device 1. Said device comprises the electrically conductive metal annular element 2 and three holding means 3 formed in one piece thereon in the circumferential direction, which means are formed as webs 7 having tabs 6. The webs 7 extend obliquely, i.e. axially and radially inwards, and have tabs 6 on the radial inner side thereof which are formed in one piece thereon. The number of holding means 3 can also be increased if it is found that the discharge capability is not sufficient. A fibre bundle 4 is fastened in each tab 6 by means of cost-effective crimping. Impressions 21 are provided on the annular element 2 in the circumferential direction, which impressions provide a spring function and ensure permanent axial bracing in the assembled state, as shown by way of example in FIG. 5.

Figure 2:
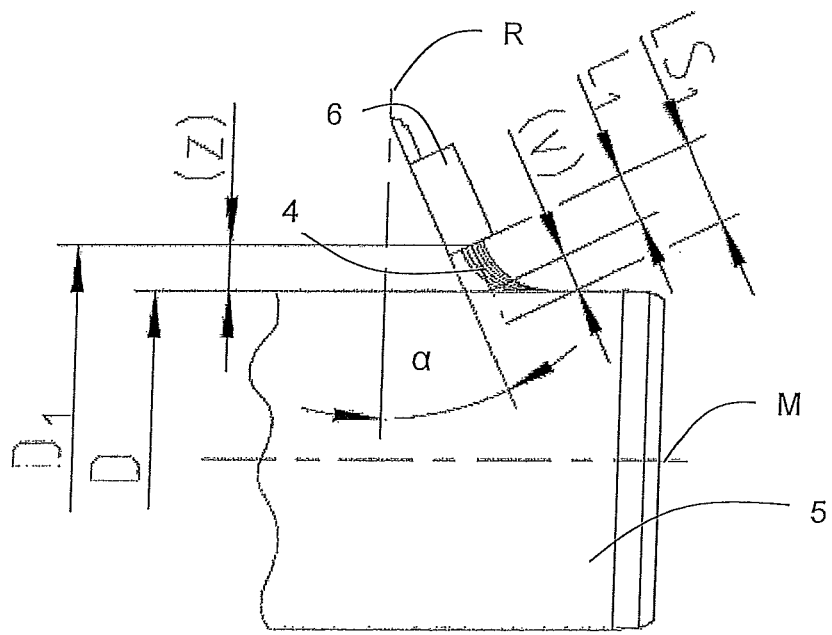
FIG. 2 is a schematic side view of the earthing device on a rotor shaft as the discharge element, showing a first angular position of the fibre bundles.

FIG. 2 is a side view of the earthing device 1 on a rotor shaft 5 as the discharge element, showing a first angular position (angle $\alpha$) of the fibre bundles 4 and a fibre length which is greater than that required to bridge the radial spacing between the annular element and the discharge element 5.

In this case, the values shown are defined as follows:
L1=length of the fibre bundles having an oblique angular position with respect to a radial plane R of the annular element 2
Ls1=length L1+additional extension of the fibre bundles by a length v
Z=radial spacing between the annular element 2 and the discharge element 5
D=diameter of the rotor shaft 5
D1=diameter of the rotor shaft 5+radial spacing between the annular element (2) and the discharge element 5

The preferred oblique angular position of the fibre bundles 4 with respect to the radial plane R of the annular element 2 is in an angular range of $\alpha$=5-45°, more preferably 5-30°, and is achieved by means of the oblique positioning of the retaining means 3. In the embodiment shown, the angular position is 25°, α being measured at the edge portion of the tab 6. In order to bridge the spacing between the annular element 2 or the tabs 6 of the retaining means 3 and the rotor shaft 5, a fibre length Z is required when the webs 7 and tabs 6 have a straight orientation and a fibre length L1 is required in the case of an oblique orientation according to FIG. 2 and FIG. 3. However, the length of the fibre bundles 4 is increased to a length Ls1 and Ls2 respectively in order to ensure bracing of the contact on the rotor shaft 5.

Figure 3:
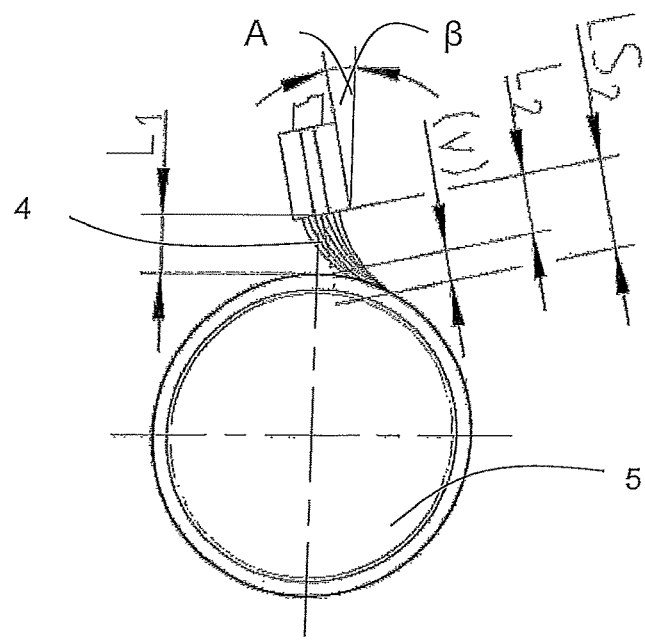
FIG. 3 is a schematic front view of the earthing device on a rotor shaft as the discharge element, showing a second angular position of the fibre bundles.

FIG. 3 is a schematic front view of the earthing device 1 on the rotor shaft 5, showing a second oblique angular position of the fibre bundles 4. In this case, the values shown are defined as follows:

L2=length of the fibre bundles having an oblique angular position with respect to an axial plane A of the annular element 2

Ls2=length L2+additional extension of the fibre bundles by a length v

The fibre bundles 4 are in each case fastened to the tab 6 so as to be oriented at an angle β of from 5-15° with respect to the axial plane of the annular element 2, the oblique position being achieved by the tab 6. In the embodiment shown, an angle β of 12° has been selected by way of example, β being measured at the edge portion of the tab 6.

The individual values are calculated in a conventional manner according to the following overview:

$$z = \frac{D1 - D}{2}$$ Overview 1

$$L1 = \frac{z}{\cos\alpha}$$

$$L1 = \frac{\frac{D1 - D}{2}}{\cos\alpha}$$

$$LS1 = L1 + \left(D * \frac{v}{100}\right)$$

$$L2 = \frac{z}{\cos\alpha}$$

$$L2 = \frac{\frac{D1 - D}{2}}{\cos\alpha}$$

$$LS2 = L2 + \left(D * \frac{v}{100}\right)$$

Figure 4:
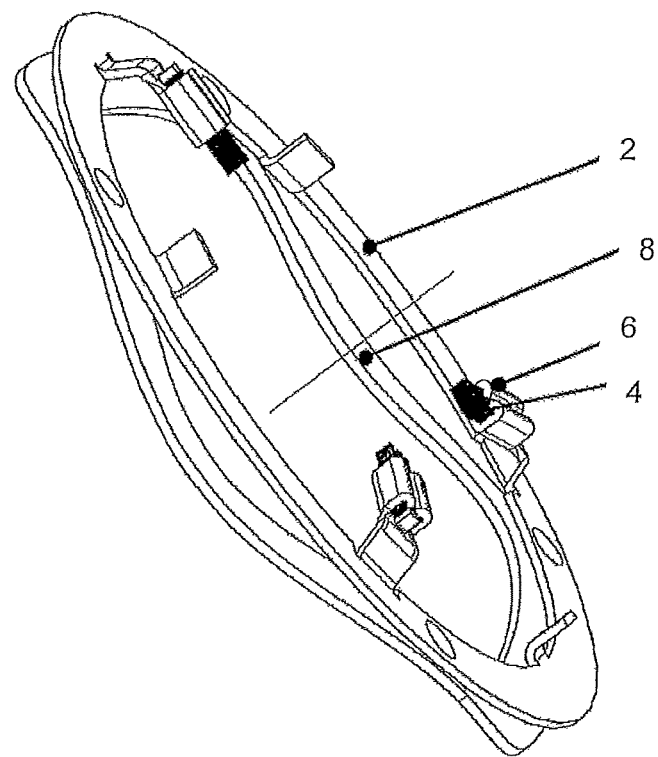
FIG. 4 is a perspective view of an earthing device comprising a spring washer.
Figure 5:
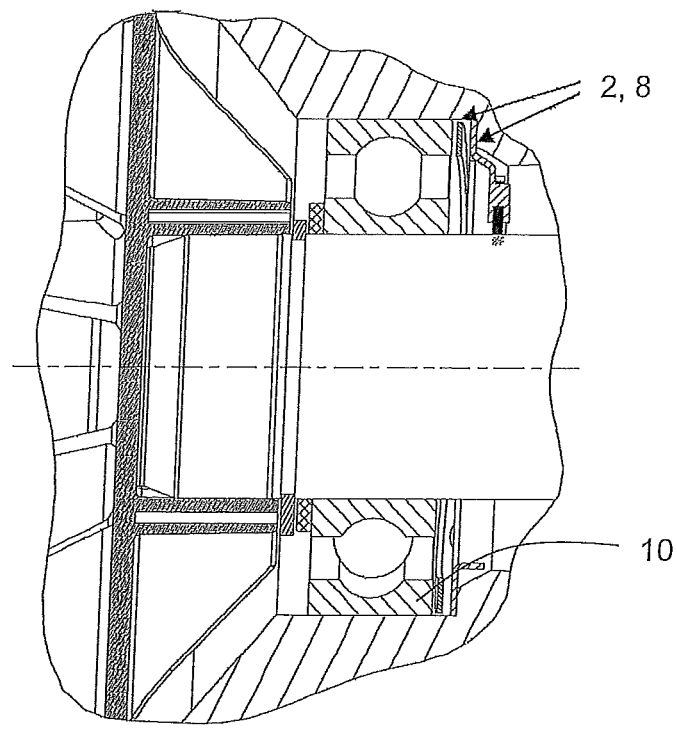
FIG. 5 is a partial sectional view, by way of example, of the earthing device in the installed state.

FIG. 4 is a perspective view of an embodiment of the earthing device 1 comprising a spring washer 8. The spring washer 8 is wave-shaped and is welded to the annular element 2 at recurrent wave troughs. Alternatively, other fastening solutions known from the prior art, such as clamps or the like, may be used. The annular element 2 and the spring washer 8 form one unit which is assembled, and the annular element 8 is held in the desired position by means of the preload of the spring washer 8. In this case, the spring washer 8 is of the same dimensions as the annular element 2. FIG. 5 shows, by way of example, an installation situation of this kind on a shaft bearing 10, in which although the oblique angular position and the excess length of the fibres are present, they cannot be seen. The earthing device 1 comprising the annular element 2 and the spring washer 8 is positioned between the stator bush and the shaft bearing 10 and forms an earth connection for static charges via the rotor shaft, in order to protect the shaft bearing 10 from bearing currents.

Figure 6:
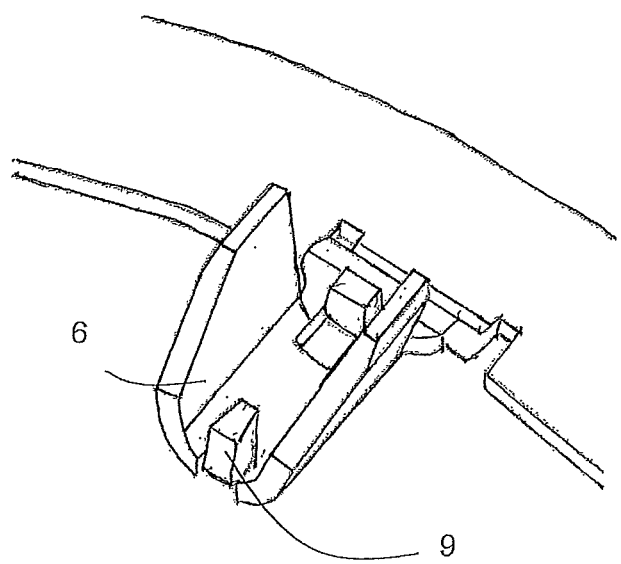
FIG. 6 shows a configuration of the tab of the annular element of the earthing device.
Figure 7:
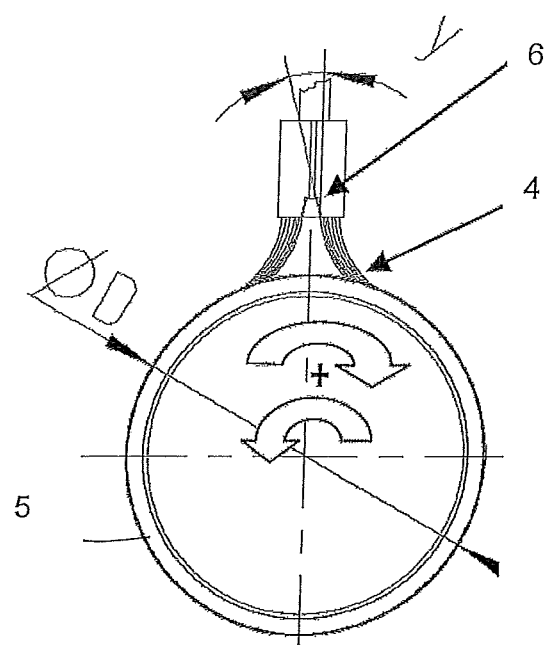
FIG. 7 shows an embodiment of the earthing device having the tab configured according to FIG. 6.

FIG. 6 shows an alternative embodiment of the tab 6 of the annular element 2 of the earthing device 1 comprising a projection 9 formed as a lug for separating the fibre bundles 4 into first and second fibre bundles, as shown in FIG. 7. The separation by means of the projection 9 permits contact of the fibre bundles 4 irrespective of the direction of rotation of the rotor shaft 5 indicated by the arrows, the fibre bundles 4 encompassing an outer surface of the rotor shaft 5 in part and thus ensuring reliable contact in both directions of rotation. The oblique angular positions and the extension of the fibre bundles correspond to those of FIGS. 2 and 3.

Figure 8:
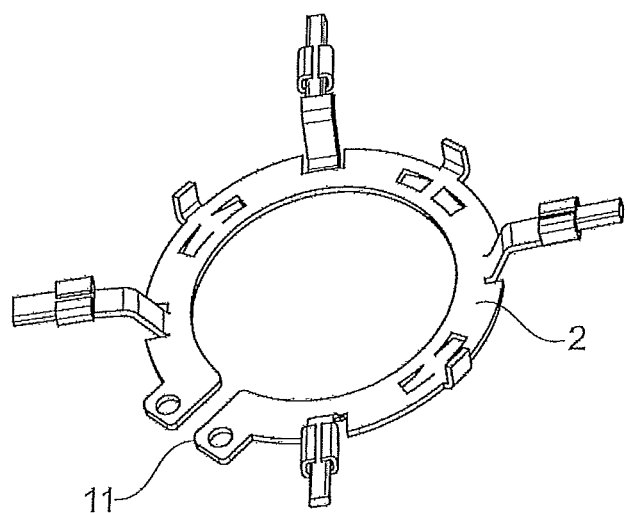
FIG. 8 is a perspective view of an alternative embodiment of the annular element of the earthing device.

FIG. 8 shows an alternative embodiment of the earthing device 1 from FIG. 1, in which the retaining means 3 extend radially outwards. In this case, the annular element 2 is fastened to the rotor shaft 5 in such a way that the fibre bundles 4 slide along the stator bush and ensure the earth connection. This is virtually a kinematic reversal of the solution from the previous embodiments, meaning that the remaining disclosed features can be directly applied. The annular element 2 is formed as an open ring having an opening 11 in the circumference thereof, the opening 11 having a function comparable to that of a retaining ring and/or being closable by means of a fastener. The open configuration can be advantageous for various installation situations.

The execution of the invention is not restricted to the preferred embodiments set out above. Rather, a number of variants are conceivable which use the solution shown even if the configurations are different. All the disclosed features can be combined with one another in any desired manner, as long as this is technically possible. For example, the annular element from FIG. 1 may also be configured as an open ring.

The invention claimed is:

1. An earthing device for preventing rotor-induced bearing currents in an electric motor, comprising:
an electrically conductive annular element having retaining means arranged thereon, to which means fibre bundles are fastened, via which bundles electrical discharge of a static charge to at least one discharge element can be carried out,
wherein the fibre bundles are fastened by way of oblique positioning of the retaining means so as to be oriented in an oblique angular position with respect to a radial plane which is perpendicular to an axial centre line of the annular element and have a length protruding from the retaining means of the annular element which is greater than that required to bridge a radial spacing between the annular element and the discharge element,
wherein webs extending in the radial direction, having tabs as retaining means in each case, are formed on the annular element, the fibre bundles being crimped to said tabs, and wherein a projection is formed on each of the respective tabs, which projection separates the fibre bundles into a first and second fibre bundle which thus extend separately from one another and each permit individual electrical discharge of the bearing currents to at least one discharge element in a manner independent of the direction of rotation.

2. The earthing device according to claim 1, wherein the fibre bundles are fastened so as to be oriented at an angle α of 5-45° with respect to the radial plane of the annular element.

3. The earthing device according to claim 1, wherein the fibre bundles are oriented in an oblique angular position with respect to an axial plane, and wherein the fibre bundles are fastened so as to be oriented at an angle β of from 5-15° with respect to the axial plane of the annular element.

4. The earthing device according to claim 1, wherein the length of the fibre bundles protruding from the annular element is approximately 5-15% greater than the radial spacing between the annular element and the discharge element.

5. The earthing device according to claim 1, wherein the fibre bundles are formed of fibres made of different materials and comprise at least carbon fibres and metal or plastics material fibres and/or graphite fibres.

6. The earthing device according to claim 1, wherein the fibre bundles are oval in cross section.

7. The earthing device according to claim 1, wherein a spring washer is fastened to the annular element, such that the annular element and the spring washer are formed as one unit for the purpose of assembly.

8. The earthing device according to claim 7, wherein the spring washer is wave-shaped and is fastened to the annular element at recurrent wave troughs.

9. The earthing device according to claim 7, wherein the spring washer is of a size which corresponds to that of the annular element.

10. The earthing device according to claim 1, wherein the annular element has a thickness of 0.2-5 mm.

11. The earthing device according to claim 1, wherein the annular element is a brass or bronze punched metal sheet.

12. The earthing device according to claim 1, wherein the annular element is formed as an open ring having an opening in the circumference of the ring the opening being selectively closed by a fastener.

13. The earthing device according to claim 1, wherein the annular element comprises impressions recurring in the circumferential direction, the impressions providing a spring function.

14. The earthing device according to claim 1, wherein the fibre bundles are fastened so as to be oriented at an angle $\alpha$ of 5-30° with respect to the radial plane of the annular element.

15. The earthing device according to claim 1, wherein the length of the fibre bundles protruding from the annular element is approximately 10% greater than the radial spacing between the annular element and the discharge element.

16. The earthing device according to claim 1, wherein the annular element has a thickness of 0.5-1 mm.

* * * * *